United States Patent [19]

Rayburn

[11] Patent Number: 5,241,774
[45] Date of Patent: Sep. 7, 1993

[54] FISHING FLOAT

[76] Inventor: Walter B. Rayburn, 3413 N. Franklin, Loveland, Colo. 80538

[21] Appl. No.: 929,537

[22] Filed: Nov. 16, 1992

[51] Int. Cl.[5] .............................................. A01K 91/00
[52] U.S. Cl. .................................... 43/44.9; 43/44.92
[58] Field of Search .................. 43/44.92, 44.93, 44.9, 43/44.87, 44.91, 44.95, 44.89

[56] References Cited

U.S. PATENT DOCUMENTS

| 322,088 | 7/1885 | Behrens | 43/44.91 |
| 427,730 | 5/1890 | Bond | 43/44.93 |
| 2,223,823 | 12/1940 | Hampton | 43/44.9 |
| 2,872,752 | 2/1959 | Salzmann | 43/44.9 |
| 3,733,734 | 5/1973 | Hysan | 43/44.9 |
| 4,696,125 | 9/1987 | Rayburn | 43/44.9 |

FOREIGN PATENT DOCUMENTS 0458429 7/1950 Italy .................... 43/44.91

Primary Examiner—Mark Rosenbaum
Assistant Examiner—James Miner
Attorney, Agent, or Firm—Charles C. Corbin

[57] ABSTRACT

Disclosed is a float device for a fishing line, the device including a buoyant body with a bore and a slot that extends radially from the bore, an elongate slit tube mounted within the bore of the buoyant body, the slit tube having a longitudinally extending slot that is alignable with the buoyant body slot. A circumferentially extending groove is provided near each end of the slit tube. A pair of end caps have an inwardly projecting annular portion that engages these grooves to hold the end caps rotatably mounted to the slit tube. Each cap has a generally cylindrical side wall, is open at one end and has a circular wall at the other end, and there is a slot that extends through the cylindrical wall and radially through the end wall from a central portion of the end wall. Each end cap can be rotated to bring its slot into alignment with the slit tube slot permitting a fishing line to be moved radially through the aligned slots and into the bore of the slit tube. The end caps can then be rotated to move their slots out of alignment with the slot of the slit tube, so as to retain the fishing line slidably within the slit tube bore.

8 Claims, 1 Drawing Sheet

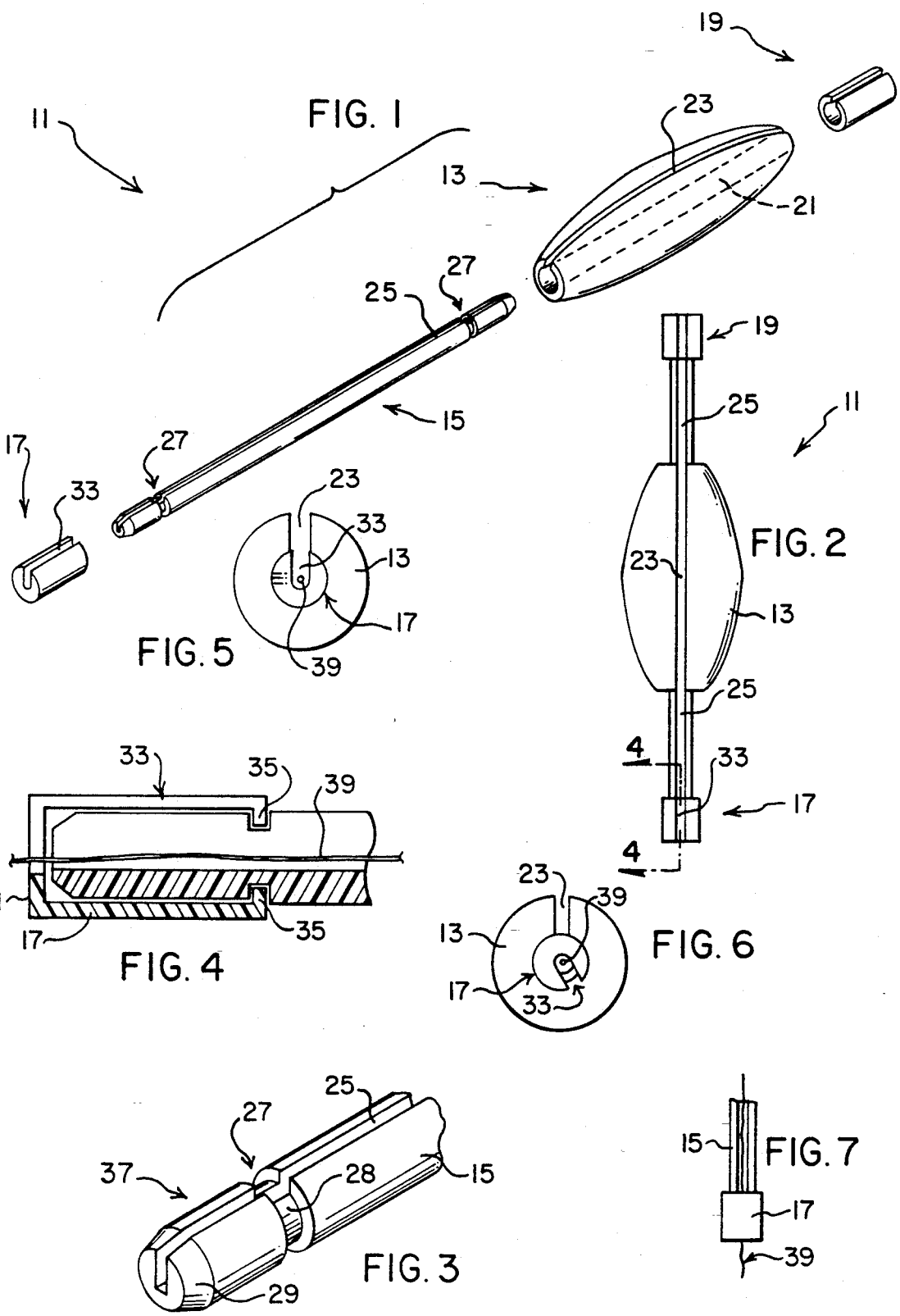

FISHING FLOAT

BACKGROUND OF THE INVENTION

1. Field of the Invention

The present invention relates to a float device that is removably attachable to a fishing line, and more particularly to such a device having a length-wise bore in which a fishing line can be slidably retained.

2. Description of the Prior Art

Fishing floats, bobbers and similar structures and devices that are attachable to fishing lines have been known for many years. Earlier designs were simple floating structures to which a line could be tethered. Later came the development of the slip-type float in which the fishing line was threaded through a permanent opening in a buoyant body, which allowed the line to slip with respect to the buoyant body in a desired manner. Because of certain limitations in these slip-type floats, efforts were made to improve upon the earlier models, to add greater versatility, and to provide easier, and simpler ways to attach a fishing line to a slip-type floating device, and to remove it therefrom as required. To this end, floating devices such as shown in U.S. Pat. Nos. 2,001,241, 4,635,392 and 4,418,492 were devised. While such prior efforts represented an improvement over the earlier designs, there nevertheless remains a need for slip-type floating devices that are simple in design yet highly effective, reliable and easy to use.

SUMMARY OF THE INVENTION

In view of the foregoing it is a general object of the present invention to provide and improved version of a slip-type float for a fishing line.

Another object of the invention is to provide a slip-type float device that can be quickly and easily secured to a fishing line and removed from the line as necessary.

A further object is to provide a slip-type float device having a simple construction allowing it to be fabricated relatively inexpensively, which allows it to be available to the consumer at a fairly inexpensive price.

Yet another object is to provide such a device that does not include separate components that can be misplaced or lost. These and other objects and advantages are brought forth by the present invention which among other things provides improved means for releasably retaining a fishing line to a float device, and which includes a buoyant body having a longitudinally extending bore and a slot extending radially and outwardly from the bore through the body of the buoyant component, and an elongate slit tube having a longitudinally extending slot therein and mounted within the bore of the buoyant body, the slot in the slit tube being alignable with the slot in the buoyant body. There are end portions of the slit tube that extend respectively from one end and the other end of the buoyant body, and spaced from each respective end of the slit tube is a circumferentially extending groove. The invention further features first and second line-retaining means mounted at the respective ends of the slit tube.

In a preferred embodiment the line-retaining means is in the form of end caps wherein each end cap is hollow and generally cylindrical, and having a first end that is open and a second end closed by a circular wall, with a slot that extends from the central portion of the end wall radially outwardly through the end wall. This end wall slot adjoins a slot that extends longitudinally through the cap cylindrical wall. There is an annular ridge projecting inwardly at the first end of the end cap and it engages the circumferentially extending groove in the slit tube to secure the end cap to the slit tube in a manner allowing rotation of the end cap relative to the slit tube. In one preferred embodiment the annular ridge engages the circumferential groove in a manner allowing free rotation of the end cap and in another preferred embodiment there is a frictional fit which permits the end cap to be rotated by hand with respect to the slit tube and to be frictionally held at any position to which the cap is rotated. The end of the slit tube lies closely to the inside of the end cap end wall, and each end cap can be rotated to bring its slot into alignment with the slot in the slit tube. Thus, when the slot in the buoyant body is aligned with the slit tube slot, and the slot in each of the end caps aligned with the slit tube slot, a fishing line may be simply and easily moved radially inwardly through the respective slots and positioned within the bore of the slit tube. The end caps can then be rotated out of alignment with the other slots of the device to retain the fishing line within the bore and to allow the line to freely pass through the open, central portions of each end cap. When it is desired to remove the float device from the fishing line, the end caps are rotated appropriately to align their slots with the slit tube slot so that the float device can be easily and quickly detached from the line.

BRIEF DESCRIPTION OF THE DRAWINGS

FIG. 1 is an exploded perspective view of a slip-type float for a fishing line according to the present invention;

FIG. 2 is an elevational view of the device of FIG. 1, in assembled condition;

FIG. 3 is a partial, enlarged perspective view showing an end portion of a slit tube component according to the present invention;

FIG. 4 is an enlarged, partial sectional view taken along the line 4—4 of FIG. 2;

FIG. 5 is an enlarged end view of the device of FIG. 2;

FIG. 6 is a view similar to FIG. 5, but showing an end cap rotated to a line-retaining position;

FIG. 7 is a partial elevational view illustrating an end cap in line-retaining position.

DETAILED DESCRIPTION OF THE INVENTION

Referring now to the drawings, FIG. 1 illustrates that the main components of a fishing float device 11 according to the present invention comprise a buoyant body 13, a slit-tube 15, and end caps 17 and 19. The buoyant body 13 is constructed of a suitable lighter-than-water material such as styrofoam or similar plastic material, and has a central longitudinal bore at 21 and a slot 23 that extends radially through the body 13 from bore 21.

Slit tube 15 is constructed of a suitably durable and rigid plastic material and is snugly fit within bore 21 of buoyant body 13 such that opposite end portions extend from opposite ends of buoyant body 13 as best illustrated in FIG. 2. FIG. 1 shows that a slot 25 extends longitudinally through the entire length of slit-tube 15 and has a generally rectangular cross-section as best shown in FIG. 3. FIG. 3 also shows that a slit-tube end portion has a circumferential groove 27 and a beveled end at 29.

End caps 17 are made of a suitable rigid yet resilient plastic material, is open at one end and has a circular end wall 31 at its other end. Note that the end caps 17 and 19 have identical constructions. A longitudinal slot 33 extends through the cylindrical wall of end cap 17 and through the cap wall 31 as shown in FIG. 1 and FIG. 4. It will be appreciated that the slots in the end caps, the slit tube 15 and the buoyant body 13 are sufficiently wide to freely pass a fishing line. End cap 17 is further characterized by an annular ridge 35, as shown in FIG 4. In a preferred embodiment the inside diameter of the annular ridge 35 is slightly larger than the diameter of the narrowed portion 28 of the slit tube groove 27. The inside diameter of the end cap 17 is also slightly larger than the diameter of the cylindrical end portion 37 of the slit tube. An end cap 17 can be quickly and easily mounted to the end of slip tube 15, the beveled end 29 resiliently spreading apart the open end of cap 17 as it is urged to the right as shown in FIG. 4, over the slit tube, and the annular ridge 35 will snap into engagement with slot 27. Thus cap 17 is secured to the slip tube, and there is sufficient spacing between the inside surfaces of the cap 17 and the slip tube to allow cap 17 to freely rotate. In another preferred embodiment of the invention, the inside diameter of annular ridge 35 is slightly smaller than narrowed portion 28 which provides sufficient frictional force to hold the cap in any position to which it is rotated.

To use the assembled device, shown in FIG. 2, where slot 23 is held in alignment with slot 25, the end caps 17 and 19 are rotated to bring their slots into general alignment with slots 23 and 25. A fishing line can then be readily moved radially through the aligned slots and engaged fully within the slip tube slot 25. The fishing line is indicated in FIGS. 6 and 7 by the reference numeral 39. End caps 17 and 19 can then be rotated to bring their slots out of alignment with slot 25 as illustrated in FIGS. 6 and 7. Thus the line 39 will be retained at both ends of device 11 while allowing the float device to move freely along line 39. When it is desired to remove the float 11 from line 39, the end caps 17 and 19 are simply rotated to bring their slots back into alignment with the slot 25.

While a particular embodiment of the invention has been described herein, it is not intended that the invention be limited thereto, since various modifications and changes may readily occur to those skilled in the art without departing from the invention. Therefore, it is aimed to cover all such changes and modifications as fall within the true spirit and scope of the invention as defined in the claims which follow.

What is claimed is:

1. Float device, for removable and slidable attachment to a fishing line, said device including a buoyant body with a longitudinal bore and a radial slot extending outwardly therefrom through said body, an elongate slit tube having a longitudinally extending bore therethrough and a slot extending radially from said tube bore, and said slit tube mounted within said body bore and said body slot alignable with said slit tube slot, said slit tube having a first end and a second end through which said slot extends, said device including:
    a) first circumferentially extending groove in said tube spaced approximate said tube first end, and a second circumferentially extending groove in said tube spaced approximate from said tube second end; and
    b) first and second line-retaining caps, each of said caps being generally cylindrical, hollow and opened at one end, having a generally cylindrical wall and a circular end wall and a bore and a longitudinally extending slot through said cylindrical wall and said circular wall, said retaining cap having an inwardly projecting annular ridge adjacent the open end of said cap, and whereby said first end cap is mounted to one end of said slit tube with said annular ridge engaged within said first groove, and the second retaining cap mounted to the other end of said tube with its annular ridge engaging said second groove whereby said first and second retaining caps are mounted for rotation with respect to said tube and whereby said end caps are rotatable to bring the slots of said end caps into alignment with said tube slot permitting said fishing line to be moved radially inwardly through the slits of said buoyant body, tube, and end caps so as to slidably engage the bore of said slit tube, and whereby said end caps are rotatable out of alignment with said tube slot so as to retain said fishing line within said bore.

2. Device as defined in claim 1 wherein the annular ridges of said end caps frictionally and slidably embrace respectively the first grooves of said tube.

3. Device as defined in claim 1 wherein the annular ridges of said end caps engage said grooves for free rotation therein.

4. Device as defined in claim 1 wherein said slot in said tube has a generally rectangular cross-sectional configuration.

5. Device as defined in claim 1 wherein the bore of each of said caps is aligned with the bore of said slit tube.

6. Device as defined in claim 1 wherein the end of said tube lies closely adjacent the inside surface of said cap end wall.

7. Device as defined in claim 1 wherein the annular ridge of said end cap is snapped into engagement with said groove.

8. Device as defined in claim 1 wherein the bore of each of said first and second caps slidably embraces a cylindrical end portion of said slit tube.

* * * * *